June 20, 1944. W. L. POLLARD 2,352,004
HYDROPLANETARY TRANSMISSION
Filed Oct. 17, 1942
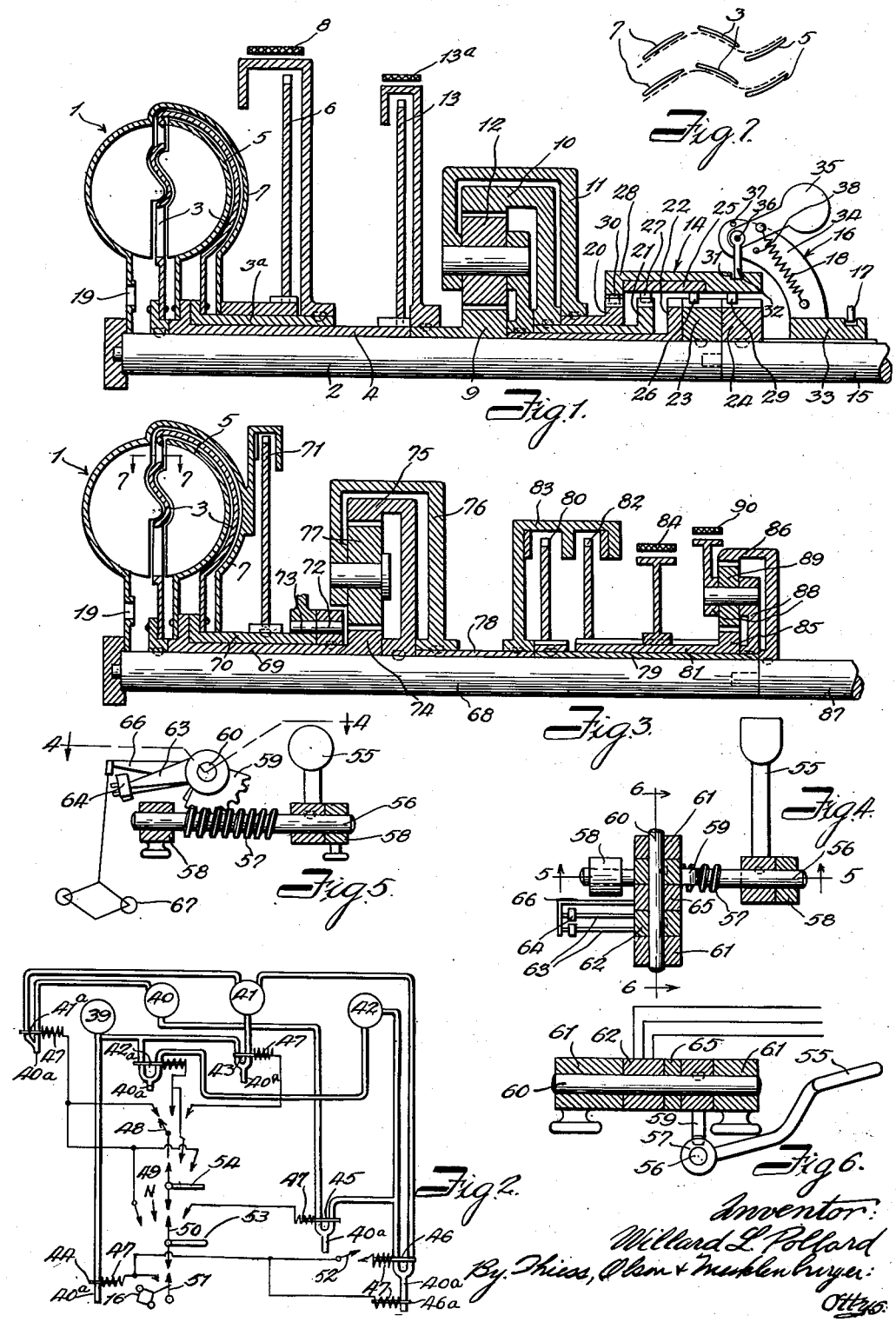

Patented June 20, 1944

2,352,004

UNITED STATES PATENT OFFICE 2,352,004

HYDROPLANETARY TRANSMISSION

Willard L. Pollard, Evanston, Ill.

Application October 17, 1942, Serial No. 462,356

18 Claims. (Cl. 74—189.5)

My invention relates to transmissions.

One of the objects of my invention is to provide an improved hydro-planetary transmission in which a comparatively large number of speed ratios may be obtained from a comparatively simple hydro-planetary construction.

A further object is to provide such a construction in which a large proportion of the power flow by-passes the hydraulic part of the transmission.

A further object is to provide such a construction in which there will always be a cushioning hydraulic action in making the shift from any speed ratio to the next speed ratio.

A further object is to provide such a construction in which the power flow will not be interrupted in making the gear shift.

Further objects will appear from the description and claims.

In the drawing, in which two forms of my invention are shown,

Fig. 1 is an axial section of a hydro-planetary transmission;

Fig. 2 is a diagrammatic view of control apparatus;

Fig. 3 is an axial sectional view showing another form of transmission;

Fig. 4 is a horizontal sectional view on the line 4—4 of Fig. 5 of control apparatus which may be used in connection with the apparatus of Fig. 2;

Fig. 5 is a sectional view substantially on the line 5—5 of Fig. 4;

Fig. 6 is a sectional view substantially on the line 6—6 of Fig. 4, and

Fig. 7 is a section on the line 7—7 of Fig. 3.

Referring to the drawing in detail and first to Figs. 1 and 2, the construction shown therein comprises a hydraulic coupler 1 which may be of the general type shown in my copending application Serial No. 410,815, Patent No. 2,322,251, a shaft 2 keyed to the torque-transmitting, fluid-transmitting rotor 3, a hollow shaft 3a secured to the rotor 3, a hollow shaft 4 secured to the turbine rotor 5, a clutch 6 for connecting the torque-transmitting rotor 3 with the pump rotor casing 7, a brake 8 for holding the torque-transmitting rotor 3 stationary, a planetary gearing comprising a sun gear 9, a ring gear 10, a gear carrier 11 and planet gearing 12 mounted on said gear carrier and meshing with said sun gear 9 and ring gear 10, a clutch 13 for connecting and disconnecting the sun gear 9 with respect to the tubular shaft 4 to which the turbine rotor 5 is secured, a brake 13a for holding the sun gear 9 against rotation, a dog clutch 14 which in one position connects the shaft 2 with the ring gear 10 and connects the propeller shaft 15 with the gear carrier 11 and which in another position connects the shaft 2 with the gear carrier 11 and connects the propeller shaft 15 with the ring gear 10, a centrifugal force mechanism 16 for controlling the action of the dog clutch 14, and a manually shiftable member 17 which also is used in controlling the dog clutch.

*Forward speeds, reverse and "no back"*

The construction described enables four forward speed ratios and reverse to be obtained. For low speed the front clutch 6 is disconnected, the front brake 8 is applied, the rear clutch 13 is connected and the rear brake 13a is released. Under these conditions the brake 8 acting through the torque-transmitting rotor 3 holds the shaft 2 against rotation. As the dog clutch 14 is in position to connect the ring gear 10 with the shaft 2, the ring gear 10 will be held against rotation. The clutch 13 connects the sun gear 9 with the turbine rotor 5 and the dog clutch 14 connects the propeller shaft 15 with the gear carrier 11. Under these conditions the gear carrier 11 and propeller shaft 15 will be turned at a relatively slow speed.

For second gear the front clutch 6 is connected, the front brake 8 is released, the rear clutch 13 is disconnected and the rear brake 13a is applied. Under these conditions the rear brake 13a holds the sun gear 9 against rotation and the front clutch 6 connects the ring gear 10, shaft 2, rotor 3 and shaft 3a to rotate with the pump rotor 7. This gives a higher speed to the gear carrier and propeller shaft.

For third speed the front and rear brakes 8 and 13a are both released and the front and rear clutches 6 and 13 are both connected. Under these conditions the ring gear 10 rotates with the pump rotor casing 7 and the sun gear 9 rotates with the turbine rotor 5, giving a still higher speed to the propeller shaft.

For fourth speed or overdrive it is assumed that the propeller shaft 15 and centrifugal mechanism 16 are turning fast enough to overcome the resistance of the coil tension spring 18 and that when the dog clutch members are brought into synchronism, centrifugal force will effect the shift of the dog clutch mechanism 14 to the rear, thus connecting the shaft 2 with the gear carrier 11 and the propeller shaft 15 with the ring gear 10. With the front brake 8 released and the front clutch 6 applied, overdrive may be obtained by releasing the rear clutch 13 and applying the rear brake 13a to hold the sun gear 9 against rotation. This will give an overdrive of the ring gear 10 and propeller shaft 15 with respect to the gear carrier 11 and shaft 2. If desired, as an alternative or supplement to the rear clutch, means may be provided for supplying and withdrawing liquid with respect to the hydraulic coupler through the opening 19.

For reverse, the dog clutch mechanism 14 is shifted to the right as viewed in Fig. 1, connecting the shaft 2 with the gear carrier 11 and the propeller shaft 15 with the ring gear 10. The clutch 6 is released and the brake 8 applied, thus holding the gear carrier 11 against rotation. The brake 13a is released and the clutch 13 applied to connect the sun gear 9 with the turbine rotor 5. This will cause reverse rotation of the ring gear 10 and propeller shaft 15.

For "no back" on hills with the dog clutch mechanism in either forward or rear position, the clutches 6 and 13 are released and the brakes 8 and 13a applied, thus holding both the sun gear 9 and ring gear 10 against rotation in either direction.

With the gear dimensions shown in the drawing, in first or low speed, the entire power flow will be through the hydraulic part of the transmission. In second speed, all the power flow will by-pass the hydraulic part. In third speed, two-thirds of the power flow will by-pass the hydraulic part. In fourth speed, or overdrive, the entire power flow will by-pass the hydraulic part. It will be noted that in the second and fourth speeds, all the power flow by-passes the hydraulic part, and that in first and third speeds power is passed through the hydraulic part. Due to this alteration from hydraulic to nonhydraulic, there will always be a cushioning hydraulic action in making the shift from any speed ratio to the next speed ratio.

The dog clutch construction shown comprises a toothed clutch member 20 keyed to the gear carrier 11, a toothed clutch member 21 keyed to the ring gear 10, a toothed clutch member 22 also keyed to the gear carrier 11, a toothed clutch member 23 keyed to the shaft 2, a toothed clutch member 24 keyed to the propeller shaft 15, a clutch sleeve 25 having clutch teeth 26 slidable in the clutch member 23, and also having clutch teeth 27 which in one position engage the clutch member 21 and in another position engage the clutch member 22, a second clutch sleeve 28 surrounding the first sleeve 25 having clutch teeth 29 slidable in the clutch teeth of the clutch member 24 and having teeth 30 which in one position engage the teeth of the clutch member 20 and in another position engage the teeth of the clutch member 21. A groove 31 is provided for engagement with the shifting arm 32 on the centrifugal control apparatus 16.

The centrifugal control mechanism comprises a sleeve 33 splined on the propeller shaft 15, a plurality of arms 34 rotatable with the sleeve 33, weighted arms 35 pivoted at 36 on the arms 34, arms 32 rockable with the arms 35, springs 18 acting against the centrifugal force of the weighted arms 35 and stops 37 and 38 for limiting the movement of the arms 35. As previously indicated, the sleeve 33 may be shifted longitudinally of the shaft 15 for a purpose hereinafter described. When the dog clutch mechanism 14 is in the left-hand position as shown in Fig. 1, the clutch sleeve 28 connects the cage 11 with the shaft 15 and the sleeve 25 connects the ring 10 with the shaft 2. This position of the dog clutch may be used in second gear and also in third gear. When the dog clutch 13 is moved to the right-hand position, the sleeve 14 will connect the shaft 15 with the ring 10 and the sleeve 25 will connect the gear carrier 11 with the shaft 1. This position of the dog clutch is used for overdrive or fourth speed and reverse and may be used for third speed.

*Control apparatus*

The control apparatus shown in Fig. 2 comprises the front clutch actuator 39, the front brake actuator 40, the rear clutch actuator 41, the rear brake actuator 42, supply conduits 40a and valve mechanisms 41a, 42a, 43, 44, 45, 46, and 46a for controlling the flow of liquid to the power clutch and brake actuators, solenoids 47 for controlling the valve mechanisms, circuit controlling devices 48, 49, 50, 51, and 52 for controlling the action of the solenoids 47, and a manually operable lever 53 for effecting the shifting of the clutch-controlling sleeve 33 for reverse and for cutting out the overdrive when desired. The circuit controller 48 is used to control low, second, and third speed. This controller may be controlled conjointly by throttle movement and car speed by means of the apparatus shown in Figs. 4, 5, and 6. The circuit controller 49 is used for forcing the speed ratio down, for example in going downhill, and may, if desired, be controlled by the left foot. The reverse lever 53 may be controlled by the right hand for manually shifting the dog clutch control sleeve 33 and for controlling certain circuits and may also be used for cutting out the overdrive and for placing the clutches and brakes in condition to effect a "no back" on hills. The circuit controller 52, which switches the overdrive on and off when the overdrive is rendered available, may be operated by the left foot of the driver and may, if desired, be on the same rock shaft as the left foot pedal 54 which forces the car into lower speed in going downhill. The circuit controller 51 is controlled by the centrifugal force mechanism 16 for placing the circuit in condition to render the overdrive available.

The valve 41a controls the flow of fluid under pressure to the actuators 40 and 41. The valve 42a controls the fluid flow to the actuators 39 and 42. The valve 43 controls the fluid flow to actuators 39 and 41. The valve 44 controls the fluid flow to actuator 39. The valve 45 controls the fluid flow to actuators 40 and 42. The valve 46 controls the fluid flow to actuators 41 and 42.

The circuit controller 48 may be controlled by the throttle position and car speed by the apparatus shown in Figs. 4, 5, and 6, hereinafter described. The circuit controllers 49 and 52 are movable together and controlled by the left foot pedal 54. The circuit controller 50 may be controlled by the right-hand lever 53, and the circuit controller 51 may be controlled by the centrifugal force mechanism 16. The actuator 39 applies the clutch 6; the actuator 40 applies the brake 8; the actuator 41 applies the clutch 13, and the actuator 42 applies the brake 13a. When the circuit controller 51 is moved to the left-hand position, the valve 46a opens to place the valve 46 in effective condition. When the valve 46 is in the left-hand position of Fig. 2, the clutch 13 is applied and the brake 13a is off, and when this valve 46 is in the right-hand position, the clutch 13 is off and the brake 13a is applied. The lever 53 actuates the clutch shifter 17 and the sleeve 33.

The following is a table showing the position or condition of the clutch 6 and its actuator 39, the brake 8 and its actuator 40, the clutch 13 and its actuator 41, the brake 13a and its actuator 42, the circuit controllers 48–52, incl., and the clutch controller 28, corresponding to the six different conditions of the transmission—first, second, third and fourth speeds forward, reverse, and "no back." In connection with this table, it is to be noted that the circuit controllers 48–52, incl., control the various solenoids 47 and their valves and that these valves control the actuators 39, 40, 41, and 42 which control the clutches 6 and 13 and the brakes 18 and 13a. It is also to be noted that the accelerator pedal and car speed jointly control the normal forward driving range through the circuit controller 48 and the valves 41a, 42a, and 43; that the left foot controls the pedal 54 which controls the slowing-down circuit controller 49 and its valves 41a and 42a and which also controls the overdrive circuit controller 52 and its valve 46. In the table "R. H." indicates right-hand position and "L. H." indicates left-hand position.

lever 53 is operated to move the circuit controller 50 to its extreme left-hand position. This will open the valve 41a and at the same time will operate the shift pin 17 to shift the sleeve 33 rearwardly, carrying with it the sleeves 28 and 25. The opening of the valve 41a will apply the brake 8 and clutch 13, and the movement of the sleeves 28 and 25 to the rear will connect the gear carrier 11 with the shaft 2 which will be held stationary by the brake 8. The movement of the sleeves 28 and 25 also connects the ring gear 10 with the driven shaft 15. The clutch 13 connects the sun gear with the turbine rotor 5.

Under these conditions the sun gear 9 is driven by the turbine, the gear carrier 11 is held against rotation and the ring gear 10 is driven in a reverse direction, carrying with it the driven shaft 15. It will be noted that when the circuit controller 50 is shifted from the position shown in Fig. 2, the circuit controllers 49 and 48 will be disconnected and rendered ineffective.

If the lever 53 is shifted in the opposite direction to move the circuit controller 50 to its right-hand position, the valve 45 will be opened and

|  | Control for ring or gear carrier | | Control for sun | | Circuit controller | | | | | Gear shift |
| --- | --- | --- | --- | --- | --- | --- | --- | --- | --- | --- |
|  | Clutch 6 and 39 | Brake 8 and 40 | Clutch 13 and 41 | Brake 13a and 42 | Right foot 48 | Left foot 49 | Right hand 50 | Speed 51 | Left foot 52 | Speed and right hand 28 |
| 1st | | On | On | | L. H. | L. H. | 3 | R. H. | Off | L. H. |
| 2nd | On | | | On | Mid | L. H. | 3 | R. H. | do | L. H. |
| 3rd | do | | On | | R. H. | L. H. | 3 | R. H. | do | L. H. |
| 4th | do | | Off and on | On and off | Off | Off | Off | L. H. | Off and on | R. H. |
| Rev | | On | On | | do | do | L. H. | R. H. | Off | R. H |
| No-back | | do | | On | do | do | R. H. | R. H. | do | L. H. |

The action of the various circuit controllers 48, 49, 50, 51, and 52 will now be outlined. When the controller 48 is in the position shown in Fig. 2, solenoid 47 is energized, valve 41a is open, and the actuators 40 and 41 are effective to apply the brake 8 and the clutch 31. This will give low or first speed.

When, due to the conjoint action of the accelerator pedal and the car speed, the controller 48 moves to mid-position, the valve 41a will close and the valve 42a will open. This will activate the actuators 39 and 42 to apply the clutch 6 and the brake 13a. This will give second speed.

When, due to the conjoint action of the accelerator pedal and car speed, the circuit controller 48 moves to its right-hand position, the valves 41a and 42a will close and the valve 43 will open, energizing the actuators 39 and 41 and applying the clutches 6 and 13. This will give third speed.

If, for any reason, it should be desirable to force the car speed to a lower speed ratio, the left foot pedal 54 may be depressed, either to mid-position to open the valve 42a or to right-hand position to open the valve 43. If the valve 42 is opened, the actuators 39 and 42 will be energized to apply the clutch 6 and the brake 13a and force the car down to second speed.

If the circuit controller 48 is moved to right-hand position, the valve 41a will be opened, the actuators 40 and 41 will be energized, the brake 8 and clutch 13 will be applied, and the car will be forced down to first or low speed.

It will be noted that when the circuit controller 49 is moved from the position shown in Fig. 2, the circuit controller 48 will be rendered ineffective, being disconnected from the circuit.

If it is desired to go into reverse, the reverse the actuators 40 and 42 energized to apply the brakes 8 and 13a, thus holding the car stationary against any tendency to back downhill.

When the car speed is high enough so that the centrifugal force device 16 can exert force sufficient to shift the sleeves 28 and 25 rearwardly when permitted to do so, the planetary gear members are brought into synchronism and the rearward shift of the sleeves 28 and 25 takes place. This synchronism may be effected in various ways, for example, by allowing the accelerator pedal to rise slightly to slow down the motor speed while the car speed continues substantially the same. This rearward shift of the sleeves 28 and 25 connects the shaft 2 with the gear carrier 11 and connects the driven shaft 15 with the ring gear 10.

Under these conditions, overdrive may be obtained by holding the sun gear 9 against rotation, and overdrive may be eliminated by connecting the sun gear 9 to rotate with the sleeve 4. This alternative connection of the sun gear 9 may be obtained by controlling the clutch 13 and the brake 13a. The means for effecting this control include the circuit controller 52 which, as previously indicated, is controlled by the left foot pedal 54. While, as noted above, the left foot pedal 54 controls both the circuit controller 49 and the circuit controller 52, it will be noted that when the transmission is in position for overdrive, the circuit controller 51 has been moved from the position shown to its left-hand position by means of the centrifugal device 16 so that the circuit controller 49 is disconnected and the circuit controller 52 is placed in effective condition. Under these conditions, the overdrive may be made effective or ineffective by means of the circuit controller 52 controlled by the left foot. When the circuit controller 52 is in the position shown, the actuator 42 is effective and the brake 13a is applied. This will give overdrive. When the circuit controller 52 is moved to energize the solenoid 47 which controls the valve 46, the actuator 41 is energized to apply the clutch 13, the brake 13a being simultaneously released. This will give direct drive. Thus, by means of the left foot, the overdrive may be used or eliminated at will.

The construction shown in Figs. 4, 5, and 6 may be used for controlling the circuit control apparatus shown diagrammatically at 46. The control may be effected in the manner shown in my copending application Serial No. 401,162, Patent No. 2,327,214. In Figs. 4, 5, and 6 is shown an apparatus similar to that shown in my aforesaid application Serial No. 401,162 but including, in addition, means for preventing the action of the speed controlled controller from disturbing the action of the throttle lever. The construction shown in Figs. 4, 5, and 6 comprises the usual accelerator pedal 55 keyed to the shaft 56 of a worm 57 mounted in bearings 58 and engaging a worm wheel 59 keyed to a shaft 60 mounted in bearings 61, a hub 62 keyed to this shaft and provided with arms 63 carrying two micrometer switches 64 slightly staggered with respect to each other, a hub 65 rockably mounted on the shaft and carrying a switch actuating arm 66, the position of which arm is controlled by a fly-ball governor 67 or the like, the position of which is controlled by the speed of the car. The worm 57 and gear 59 are so designed that pressing down on the accelerator pedal 55 will cause downward movement of the switch carrying arm 63. The flyball governor 67 is so connected that an increase in speed of the car will move the switch controlling arm 66 downward. With this construction, it will be seen that the farther down the accelerator pedal 55 is pressed, the greater will be the car speed necessary to effect actuation of the micrometer switches 64. The worm 57 and worm gear 59 are so positioned that force tending to rotate the gear 59 will not cause rotation of the worm 57 so that any force exerted on the arm 63 by the arm 66 will not disturb the accelerator pedal 55.

The switch connections with the circuit are such that when neither switch 64 is actuated, the solenoid for the valve 41 will be energized and neither of the solenoids for the valves 42 and 43 will be energized, such that when the upper switch 64 is actuated, the solenoid 47 for the valve 42 will be energized and neither of the solenoids for the valves 41 and 43 will be energized, and such that when the lowermost switch 64 is energized, the solenoid 47 for the valve 43 will be energized and neither of the solenoids for the valves 41 and 42 will be energized. The micrometer switches 64 and the circuits controlled thereby may be similar to the switches and circuits disclosed in my copending application Serial No. 401,162, filed July 5, 1941.

If it is desired to force the speed ratio down from fourth speed or overdrive to third speed, regardless of the action of the centrifugal governor 16, the shift pin 17 may be shifted to the left, as viewed in Fig. 1, to hold the clutch sleeve 14 in the position shown in Fig. 1.

The construction shown in Fig. 3 comprises a hydraulic coupler 1, substantially like the coupler 1 shown in Fig. 1, a shaft 68 to which the fluid-transmitting torque-transmitting rotor 3 is keyed, a hollow shaft 69 to which the turbine rotor 5 is secured, another hollow shaft 70 which is secured to the torque-transmitting rotor 3, a clutch 71 for connecting and disconnecting the hollow shaft 70 with respect to the casing 7 of the pump rotor, one-way anchorages 72 and 73 for the shafts 69 and 70, respectively, a planetary gearing comprising a sun gear 74 secured to the hollow shaft 69, a ring gear 75 secured to the shaft 68, a gear carrier 76, planet gearing 77 mounted on the gear carrier 76 and meshing with the sun gear 74 and ring gear 75, a tubular shaft 78 to which the gear carrier 76 is keyed, a hollow shaft 79, a clutch 80 for connecting and disconnecting this hollow shaft with respect to the hollow shaft 78 and gear carrier 76, a second hollow shaft 81, a clutch 82 for connecting and disconnecting this hollow shaft 81 with respect to the clutch housing 83 and shaft 78, a brake 84 for holding the hollow shaft 81 against rotation when desired, a planetary gearing comprising a sun gear 85 secured to the shaft 81, a ring gear 86 keyed to the propeller shaft 87, a gear carrier 88 keyed to the hollow shaft 79, planet gearing 89 mounted on the gear carrier 88 and meshing with the sun gear 85 and ring gear 86, and a brake 90 for holding the gear carrier 88 against rotation when desired.

Any suitable means may be provided for supplying and withdrawing liquid through the passage 19 to render the pump rotor effective or ineffective as desired with respect to the turbine rotor 5. The coupler controller 19, the clutch 71, the clutches 80 and 82 and the brakes 84 and 90 may be controlled in any suitable manner, either manually or automatically. This transmission has three different speed ratios of the shaft 78 with respect to the pump rotor casing 7. It will be noted that the said shaft 78 is the sole drive for the rear planetary transmission. This rear planetary transmission has two different forward speed ratios and one reverse speed ratio with respect to the shaft 78. Therefore, the overall transmission, including both planetaries, may have six different forward speed ratios of the shaft 87 with respect to the pump rotor casing 7 and three reverse speed ratios of the shaft 87 with respect to the pump rotor casing 7.

The connections for the three different speed ratios of the forward planetary transmission will first be described. For first or low speed, the clutch 71 is disconnected and liquid is supplied to the pump rotor casing 7. Under these conditions, the turbine rotor 5 will drive the sun gear 74, and the ring gear 75 will be held against reverse rotation by the one-way anchorage 73. If desired, the pump rotor 7, the turbine rotor 5, and the liquid-transmitting rotor 3 may be provided with blades set at the angles shown in Fig. 7 so that the liquid-transmitting rotor 3 will act as a reactance stator when held by the one-way anchor 73, giving a torque to the turbine rotor 5 which may be several times greater than the torque of the pump rotor 7.

For second speed, the pump rotor casing 7 is emptied of liquid and the clutch 71 is actuated to connect the rotor 3 with the pump rotor housing 7. Under these conditions, the ring gear 75 is driven from the pump rotor housing 7, through the clutch 71, rotor 3 and shaft 68. The sun gear 74 is held against reverse rotation by the one-way anchor 72.

For third speed, the clutch 71 is connected and the pump rotor housing 7 is filled with liquid. Under these conditions the sun gear 74 is driven by the turbine rotor 5 and the ring gear 75 is driven by the pump rotor housing 7.

The connections for the two forward speeds and reverse speed of the rear planetary transmission will now be described.

For direct drive, the sun gear 85 and the gear carrier 88 are both connected to the clutch housing 83 by the clutches 80 and 82. For overdrive, the clutch 82 is released and the brake 84 is applied, leaving the clutch 80 connected with the clutch housing 83. This holds the sun gear 85 against rotation and connects the gear carrier 88 with the clutch housing 83 to give an overdrive of the ring gear 86 and driven shaft 87. For reverse, the clutch 80 is disconnected, the clutch 82 is applied, the brake 84 is released and the brake 90 is applied. This will connect the sun gear 85 to rotate with the clutch housing 83 and will hold the gear carrier 88 against rotation, thus giving a reverse drive to the ring gear 86 and driven shaft 87.

Further modifications will be apparent to those skilled in the art and it is desired, therefore, that the invention be limited only by the scope of the appended claims.

Having thus described my invention, what I claim and desire to secure by Letters Patent is:

1. A hydraulic gear construction comprising a rotary drive member, a liquid torque transmitter including a vaned drive rotor driven from said drive member and a vaned driven rotor driven from said vaned drive rotor, a liquid-transmitting torque-transmitting rotor extending across the space between said vaned rotors, a first gear means driven from said driven vaned rotor, a second gear means driven from said liquid-transmitting rotor, means for placing said liquid-transmitting rotor into and out of positive driven relation with respect to said rotary drive member, and means for holding it against rotation in at least one direction when not in said driven relation.

2. A hydraulic gear construction comprising a rotary drive member, a liquid torque transmitter including a vaned drive rotor driven from said drive member and a vaned driven rotor driven from said vaned drive rotor, a liquid-transmitting torque-transmitting rotor extending across the space between said vaned rotors, a first gear means driven from said driven vaned rotor, a second gear means driven from said liquid-transmitting rotor, means for placing said liquid-transmitting rotor into and out of driven relation with respect to said rotary drive member, and one-way anchorage means for holding it against rotation in at least one direction when not in said driven relation.

3. A hydraulic gear construction comprising a rotary drive member, a liquid torque transmitter including a vaned drive rotor driven from said drive member and a vaned driven rotor driven from said vaned drive rotor, a liquid-transmitting torque-transmitting rotor extending across the space between said vaned rotors, a first gear means driven from said driven vaned rotor, a second gear means driven from said liquid-transmitting rotor, means for placing said liquid-transmitting rotor into and out of positive driven relation with respect to said rotary drive member, and one-way anchorage means for holding it against rotation in at least one direction when not in said driven relation.

4. A hydraulic gear construction comprising a rotary drive member, a liquid torque transmitter including a vaned drive rotor driven from said drive member and a vaned driven rotor driven from said vaned drive rotor, a liquid-transmitting torque-transmitting rotor extending across the space between said vaned rotors, a first gear means driven from said driven vaned rotor, a second gear means driven from said liquid-transmitting rotor, means for placing said liquid-transmitting rotor into and out of positive driven relation with respect to said rotary drive member, means for holding it against rotation in at least one direction when not in said driven relation, and a third gear means driven from both said first and second gear means.

5. A hydraulic gear construction comprising a rotary drive member, a liquid torque transmitter including a vaned drive rotor driven from said drive member and a vaned driven rotor driven from said vaned drive rotor, a liquid-transmitting torque-transmitting rotor extending across the space between said vaned rotors, a first gear means driven from said driven vaned rotor, a second gear means driven from said liquid-transmitting rotor, means for placing said liquid-transmitting rotor into and out of driven relation with respect to said rotary drive member, means for holding it against rotation in at least one direction when not in said driven relation, means for freeing said first gear means from driven relation with respect to said driven vaned rotor, means for holding said first gear means against rotation in at least one direction when not in said driven relation, a gear carrier, planet gearing carried by said carrier and meshing with said first and second gear means, and means for disconnecting said liquid-transmitting rotor from driving relation with respect to said second gear means and connecting it in force-transmitting relation to said gear carrier.

6. A hydraulic gear construction comprising a rotary drive member, a liquid torque transmitter including a vaned drive rotor driven from said drive member and a vaned driven rotor driven from said vaned drive rotor, a liquid-transmitting torque-transmitting rotor extending across the space between said vaned rotors, a first gear means driven from said driven vaned rotor, a second gear means driven from said liquid-transmitting rotor, means for placing said liquid-transmitting rotor into and out of driven relation with respect to said rotary drive member, means for holding it against rotation in at least one direction when not in said driven relation, means for freeing said first gear means from driven relation with respect to said driven vaned rotor, means for holding said first gear means against rotation in at least one direction when not in said driven relation, a gear carrier, planet gearing carried by said carrier and meshing with said first and second gear means, means for disconnecting said liquid-transmitting rotor from driving relation with respect to said second gear means and connecting it in force-transmitting relation to said gear carrier, a rotatable driven member, and means for alternatively connecting said rotatable driven member in driven relation either to said second gear means or to said gear carrier.

7. A hydraulic gear construction comprising a rotary drive member, a liquid torque transmitter including a vaned drive rotor driven from said drive member and a vaned driven rotor driven from said vaned drive rotor, a liquid-transmitting torque-transmitting rotor extending across the space between said vaned rotors, a first gear means driven from said driven vaned rotor, a second gear means driven from said liquid-transmitting rotor, means for placing said liquid-transmitting rotor into and out of driven relation with respect to said rotary drive member, and means for holding it against rotation in at least one direction when not in said driven relation, said vaned rotors and said liquid-transmitting rotors having vanes set at such angles that the liquid-transmitting rotor acts as a reactance stator when held against rotation.

8. A hydraulic gear construction comprising a rotary drive member, a liquid torque transmitter including a vaned drive rotor driven from said drive member and a vaned driven rotor driven from said vaned drive rotor, a liquid-transmitting torque-transmitting rotor extending across the space between said vaned rotors, a first gear means driven from said driven vaned rotor, a second gear means driven from said liquid-transmitting rotor, means for placing said liquid-transmitting rotor into and out of driven relation with respect to said rotary drive member, means for holding it against rotation in at least one direction when not in said driven relation, and a third gear means driven from both said first and second gear means, said vaned rotors and said liquid-transmitting rotors having vanes set at such angles that the liquid-transmitting rotor acts as a reactance stator when held against rotation.

9. A hydraulic gear construction comprising a rotary drive member, a liquid torque transmitter including a vaned drive rotor driven from said drive member and a vaned driven rotor driven from said vaned drive rotor, a liquid-transmitting torque-transmitting rotor extending across the space between said vaned rotors, a first gear means driven from said driven vaned rotor, a second gear means driven from said liquid-transmitting rotor, means for placing said liquid-transmitting rotor into and out of driven relation with respect to said rotary drive member, means for holding it against rotation in at least one direction when not in said driven relation, means for freeing said first gear means from driven relation with respect to said driven vaned rotor, and means for holding said first gear means against rotation in at least one direction when not in said driven relation, said vaned rotors and said liquid-transmitting rotors having vanes set at such angles that the liquid-transmitting rotor acts as a reactance stator when held against rotation.

10. A hydraulic planetary transmission comprising rotary drive means, pump rotor means driven by said drive means, turbine rotor means driven by said pump rotor means, a gear carrier, planet gearing carried by said gear carrier, a first gear meshing with said planet gearing, a second gear meshing with said planet gearing, means for connecting said first gear in driven relation to said turbine rotor means and for disconnecting it therefrom, anchorage means for holding said first gear against reverse rotation with respect to the direction of rotation of said turbine rotor means when disconnected therefrom, means for connecting said second gear for rotation in driven relation to said drive means and for disconnecting it therefrom, and anchorage means for holding said second gear against reverse rotation with respect to the direction of rotation of said drive means when disconnected therefrom, said vaned rotors and said liquid-transmitting rotors having vanes set at such angles that the liquid-transmitting rotor acts as a reactance stator when held against rotation.

11. A hydraulic gear construction comprising a rotary drive member, a liquid torque transmitter including a vaned drive rotor driven from said drive member and a vaned driven rotor driven from said vaned drive rotor, a liquid transmitting torque-transmitting rotor extending across the space between said vaned rotors, a driven shaft, a planetary gearing comprising a sun gear, a ring gear, a gear carrier, and planet gearing mounted on said gear carrier and meshing with said sun gear and ring gear, means for either holding said torque-transmitting rotor against rotation or connecting it in driven relation to said drive member, means for holding said sun gear against rotation or connecting it in driven relation to said vaned driven rotor, means for connecting and disconnecting said gear carrier with respect to said driven shaft and for connecting and disconnecting it with respect to said torque-transmitting rotor, and means for connecting and disconnecting said ring gear with respect to said driven shaft and for connecting and disconnecting it with respect to said torque-transmitting rotor.

12. A hydraulic gear construction comprising a rotary drive member, a liquid torque transmitter including a vaned drive rotor driven from said drive member and a vaned driven rotor driven from said vaned drive rotor, a liquid-transmitting torque-transmitting rotor extending across the space between said vaned rotors, a first gear means driven from said driven vaned rotor, a second gear means driven from said liquid-transmitting rotor, means for placing said liquid-transmitting rotor into and out of positive driven relation with respect to said rotary drive member, means for holding it against rotation in at least one direction when not in said driven relation, means for freeing said first gear means from driven relation with respect to said driven vaned rotor, and means for holding said first gear means against rotation in at least one direction when not in said driven relation.

13. A hydraulic gear construction comprising a rotary drive member, a liquid torque transmitter including a vaned drive rotor driven from said drive member and a vaned driven rotor driven from said vaned drive rotor, a liquid-transmitting torque-transmitting rotor extending across the space between said vaned rotors, a first gear means driven from said driven vaned rotor, a second gear means driven from said liquid-transmitting rotor, means including clutch means outside said liquid torque transmitter for placing said liquid-transmitting rotor into and out of positive driven relation with respect to said rotary drive member, and means for holding it against rotation in at least one direction when not in said driven relation.

14. A hydraulic gear construction comprising a rotary drive member, a liquid torque transmitter including a vaned drive rotor driven from said drive member and a vaned driven rotor driven from said vaned drive rotor, a liquid-transmitting torque-transmitting rotor extending across the space between said vaned rotors, a first gear means driven from said driven vaned rotor, a second gear means driven from said liquid-transmitting rotor, means including clutch means outside said liquid torque transmitter or placing said liquid-transmitting rotor into and out of positive driven relation with respect to said rotary drive member, means for holding it against rotation in at least one direction when not in said driven relation, and a third gear means driven from both said first and second gear means.

15. A hydraulic gear construction comprising a rotary drive member, a liquid torque transmitter including a vaned drive rotor driven from said drive member and a vaned driven rotor driven from said vaned drive rotor, a liquid-transmitting torque-transmitting rotor extending across the space between said vaned rotors, a first gear means driven from said driven vaned rotor, a second gear means driven from said liquid-transmitting rotor, means including clutch means outside said liquid torque transmitter for placing said liquid-transmitting rotor into and out of positive driven relation with respect to said rotary drive member, means for holding it against rotation in at least one direction when not in said driven relation, means for freeing said first gear means from driven relation with respect to said driven vaned rotor, and means for holding said first gear means against rotation in at least one direction when not in said driven relation.

16. A transmission including a planetary transmission comprising a sun gear, a ring gear, a gear carrier and planet gearing mounted on said gear carrier and meshing with said sun gear and ring gear, a drive rotor, a driven shaft, an intermediate shaft in alignment with said driven shaft, means for alternatively connecting said driven shaft with said gear carrier and ring gear, means for alternatively connecting said intermediate shaft with said ring gear and gear carrier, means for placing said intermediate shaft into and out of driven relation with respect to said drive rotor, and means for holding said intermediate shaft against rotation when not in said driven relation.

17. A transmission including a planetary transmission comprising a sun gear, a ring gear, a gear carrier and planet gearing mounted on said gear carrier and meshing with said sun gear, a ring gear, a drive rotor, a driven shaft, an intermediate shaft in alignment with said driven shaft, means for alternatively connecting said driven shaft with said gear carrier, a ring gear, means for alternatively connecting said intermediate shaft with said ring gear and gear carrier, means for placing said intermediate shaft into and out of driven relation with respect to said drive rotor, means for holding said intermediate shaft against rotation when not in said driven relation, and means for placing said sun gear into and out of driven relation with respect to said drive rotor.

18. A transmission including a planetary transmission comprising a sun gear, a ring gear, a gear carrier and planet gearing mounted on said gear carrier and meshing with said sun gear, a ring gear, a drive rotor, a driven shaft, an intermediate shaft in alignment with said driven shaft, means for alternatively connecting said driven shaft with said gear carrier, a ring gear, means for alternatively connecting said intermediate shaft with said ring gear and gear carrier, means for placing said intermediate shaft into and out of driven relation with respect to said drive rotor, means for holding said intermediate shaft against rotation when not in said driven relation, means for placing said sun gear into and out of driven relation with respect to said drive rotor, and means for holding said sun gear against rotation when not in said driven relation.

WILLARD L. POLLARD.